US012602444B2

(12) United States Patent
Singh et al.

(10) Patent No.: US 12,602,444 B2
(45) Date of Patent: *Apr. 14, 2026

(54) METHOD AND SYSTEM FOR PROVIDING CUSTOMIZED EXPERIENCE TO A USER PROFILE

(71) Applicant: MOENGAGE INC., San Francisco, CA (US)

(72) Inventors: Arvinder Singh, Mohali (IN); Nilesh Kumar Soni, Bangalore (IN); Karthik Deivasigamani, Bangalore (IN); Yashwanth Kumar, Bangalore (IN); Ajish Nair, Pune (IN)

(73) Assignee: MOENGAGE INDIA PRIVATE LIMITED, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 19/058,632

(22) Filed: Feb. 20, 2025

(65) Prior Publication Data

US 2025/0348548 A1     Nov. 13, 2025

Related U.S. Application Data

(63) Continuation of application No. 18/811,261, filed on Aug. 21, 2024, now Pat. No. 12,259,936.

(30) Foreign Application Priority Data

May 8, 2024     (IN) .............................. 202411036397

(51) Int. Cl.
| | |
|---|---|
| *G06F 16/95* | (2019.01) |
| *G06F 16/906* | (2019.01) |
| *G06F 16/9535* | (2019.01) |

(52) U.S. Cl.
CPC ........ *G06F 16/9535* (2019.01); *G06F 16/906* (2019.01)

(58) Field of Classification Search
CPC ............. G06F 16/9535; G06F 16/9536; G06F 16/9538; G06F 16/906; G06F 16/90
See application file for complete search history.

(56) References Cited

U.S. PATENT DOCUMENTS

| | | |
|---|---|---|
| 8,595,234 B2 | 11/2013 | Siripurapu |
| 10,282,747 B2 | 5/2019 | Sachdev et al. |
| (Continued) | | |

FOREIGN PATENT DOCUMENTS

| | | |
|---|---|---|
| CN | 112559826 A | 3/2021 |

OTHER PUBLICATIONS

Office Action dated Dec. 15, 2025, issued in U.S. Appl. No. 19/058,707 (19 pages).

*Primary Examiner* — Merilyn P Nguyen
(74) *Attorney, Agent, or Firm* — Jason A. Smith; Shumaker, Loop & Kendrick, LLP

(57) ABSTRACT

A method for providing one or more customized experience to a user profile associated with an application is disclosed. The method comprises querying a key-value pair store for retrieving a key-value pair associated with the user profile. The retrieved key-value pair is loaded into a first memory. Further, one or more segment definitions for the one or more segments are received from a second memory. The one or more segment definitions are based on at least one of the user profile, user behaviour, user transaction on the application, user interaction with the application, and user subscription. Further, the one or more segment definitions and the one or more user events are evaluated in the first memory. The customized experience is provided to the user profile within sub-second latency and the customized experience is updated based on change in the one or more user events associated with the user profile.

14 Claims, 6 Drawing Sheets

(56)  References Cited

U.S. PATENT DOCUMENTS

| | | | | |
|---|---|---|---|---|
| 11,514,004 | B2 * | 11/2022 | Teyer ................... | G06F 16/2455 |
| 12,361,162 | B2 * | 7/2025 | Wang ................... | G06F 21/6245 |
| 12,368,911 | B1 * | 7/2025 | Arazi ........................ | G06N 3/09 |
| 2005/0027741 | A1 | 2/2005 | Eichstaedt et al. | |
| 2005/0131778 | A1 * | 6/2005 | Bennett .................. | G06Q 30/02 |
| | | | | 705/29 |
| 2011/0258049 | A1 * | 10/2011 | Ramer ............... | G06Q 30/0273 |
| | | | | 705/14.69 |
| 2012/0054040 | A1 | 3/2012 | Bagherjeiran et al. | |
| 2016/0004733 | A1 | 1/2016 | Cao et al. | |
| 2017/0235537 | A1 * | 8/2017 | Liu ........................ | G06F 3/1454 |
| | | | | 715/759 |
| 2020/0151747 | A1 | 5/2020 | Tang et al. | |
| 2021/0035046 | A1 * | 2/2021 | Bhardwaj ................ | G06N 5/04 |
| 2022/0335184 | A1 | 10/2022 | Wesley et al. | |
| 2022/0343250 | A1 | 10/2022 | Tremblay et al. | |
| 2022/0382755 | A1 | 12/2022 | Batsakis | |
| 2022/0391846 | A1 | 12/2022 | Beaver, III et al. | |
| 2023/0065398 | A1 * | 3/2023 | Purdy .................. | H04L 63/1433 |
| 2023/0128788 | A1 * | 4/2023 | Millington ......... | G01C 21/3605 |
| | | | | 701/533 |
| 2023/0325387 | A1 * | 10/2023 | Irvine ............... | G06F 16/24553 |
| | | | | 707/722 |
| 2023/0385133 | A1 | 11/2023 | Laskey et al. | |

* cited by examiner

200

202-1

202-2

210

Web Server
204-1

Web Server
204-2

Web Server
204-N

User Action
Processor
208

Key Value
store
206

300

302

Querying a key-value pair store for retrieving a key-value pair.

304

Loading the retrieved key-value pair into a first memory.

306

Receiving one or more segment definitions for the one or more segments.

308

Evaluating the one or more segment definitions and one or more retrieved events

310

Providing one or more customized experience to the classified user profile.

A

Updating the one or more customized experience based on change in the one or more user events.

METHOD AND SYSTEM FOR PROVIDING CUSTOMIZED EXPERIENCE TO A USER PROFILE

PRIORITY INFORMATION

The present application is a continuation application for the US Parent application Ser. No. 18/811,261 filed on Aug. 21, 2024, and claims priority from Indian Patent Application number 202411036397 dated May 8, 2024.

TECHNICAL FIELD

The present disclosure relates to computing environments, and more particularly to methods, techniques, and systems for providing one or more customized experience to a user provide associated with an application.

BACKGROUND

With customized experiences, digital marketing is quickly changing to meet each user's unique wants and preferences. Businesses may now develop tailored ads that connect with their target audience more deeply by utilizing sophisticated data analytics and innovative targeting strategies. Delivering information and offers that fit each user's interests, behaviours, and previous interactions is the goal, whether that information is provided through dynamic website content, targeted email marketing, or personalized social media interactions. Thus, one of the challenges is to provide this information to the users accurately and with minimum delay. However, it is more challenging when the number of users increases along with their changing behaviour/interactions with the mobile or web application.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for classifying a user of an application into one or more segments. This summary is not intended to identify essential features of the claimed subject matter nor is it intended for use in determining or limiting the scope of the claimed subject.

In one implementation, a method for providing one or more customized experience to a user profile associated with an application with sub-second latency is disclosed. The method comprises querying a key-value pair store for retrieving a key-value pair associated with the user profile. A key in the key-value pair indicates an identification (ID) of a user and a value in the key-value pair indicates one or more events associated with the user profile. The key-value pair store stores key-value pairs for multiple user profiles The retrieved key-value pair is loaded into a first memory. Further, one or more segment definitions for the one or more segments are received into a first memory. The one or more segment definitions are based on at least one of the user profile, user behaviour, user transaction on the application, user interaction with the application, and user subscription.

The one or more segment definitions are stored in a second memory. The one or more segment definitions comprise rules for mapping the one or more user events to one or more segments. Further, the one or more segment definitions and the one or more user events are evaluated in the first memory. The evaluation comprises converting the one or more segment definitions into a plurality of filter conditions. Further, mapping the one or more retrieved events associated with the user profile with the plurality of filter conditions. The user profile is further classified into the one or more segments based on the mapping. Furthermore, the one or more customized experience is provided to the user profile within the sub-second latency and the one or more customized experience is updated based detecting a change in the one or more user events associated with the user profile.

In yet another implementation, a system for providing one or more customized experience to a user profile associated with an application with sub-second latency is disclosed. The system comprises a memory storing one or more instructions. The memory is further commutatively coupled with a processor, wherein the one or more instructions upon execution causes the processor to query a key-value pair store for retrieving a key-value pair associated with the user profile. A key in the key-value pair indicates an ID of a user and a value in the key-value pair indicates one or more events associated with the application. The key-value pair store stores key-value pairs for multiple user profiles. The retrieved key-value pair is loaded into a first memory. Further, one or more segment definitions for the one or more segments are received. The one or more segment definitions are based on at least one of user profile, user behaviour, user transaction on the application, user interaction with the user profile, and user subscription. The one or more segment definitions are stored in a second memory. The one or more segment definitions comprise rules for mapping the one or more user events to one or more segments. Further, the one or more segment definitions and the one or more user events are evaluated in the first memory. The evaluation comprises, converting the one or more segment definitions into a plurality of filter conditions and mapping the one or more retrieved events associated with the user profile with the plurality of filter conditions. The user profile is further classified into the one or more segments based on the mapping. Furthermore, the one or more customized experience is provided to the user profile with in the sub-second latency and the one or more customized experience is updated based on detecting change in the one or more user events associated with the user profile

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for providing one or more customized experience to a user profile is disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
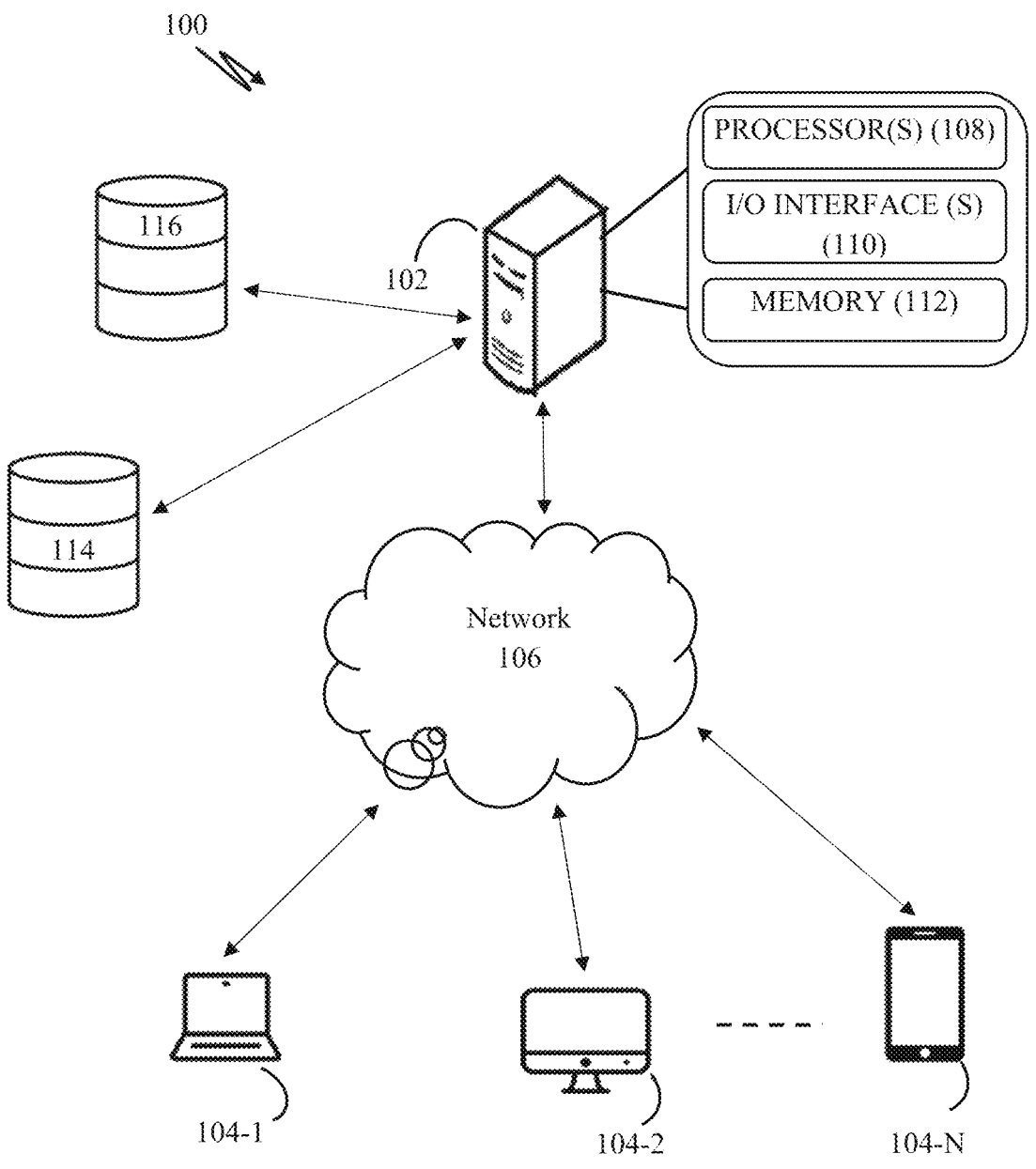
FIG. 1 is a block diagram of a system illustrating a network implementation for providing one or more customized experience to a user profile, in accordance with various embodiments of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "querying" "receiving," "storing," "retrieving," "mapping," "classifying" "evaluating", "providing", "updating", "converting" and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

In the context of digital marketing, user segmentation is essential for comprehending and interacting with a wide range of users. Organizations track a combination of actions users perform while interacting with online or mobile applications to classify the users into one or more categories or segments. In particular, these categories give organizations the ability to develop specialized tactics and unique customer experiences. For example, if the users purchase items, simply scroll items, and the like, based on these patterns, users may be categorised such that they receive one customized experience. However, to deal with large volume of user events from multiple tenants a scalable infrastructure is required, ensuring that the system can efficiently handle increasing workloads without sacrificing performance. For example, like 20000 user events associated with one user. Another challenge is to classify the users into different categories or segments such that the user may receive recommendations according to the category to which the user belongs. One of the major challenges is to classify the users into different categories so that they may receive the customized experience with minimum latency. This can further be explained with the help of an example, a scenario in an e-commerce application where a user has added multiple items to their cart but hasn't completed the purchase yet. As they navigate back to the main screen, there's a crucial opportunity to entice them with deals or promotions to encourage them to make the purchase. Nonetheless, this must occur at a very fast rate in order to avert any potential business loss caused by the tiniest delay. In order to provide deals or promotions the system may analyse the browsing behaviour of the user, past history, and the like. This analysis should be performed with a sub-second latency delay such that the customer is not lost. Thus, there exist a technical challenge to perform all the computations for categorizing the user into one or more segments in order to provide the customized experience, all within sub-second latency. The challenge becomes more difficult with dynamic nature of user events. As the number of users of these tenant applications increases, assigning the users into required categories with minimum latency becomes again a challenging task. Hence, the proposed method and system, on the other hand, offer a solution to these issues.

The present subject matter discloses a method and a system for providing one or more customized experience to a user profile. The user associated with the user profile interacts with multiple web or mobile applications via user device and perform one or more actions. The user device may be a laptop, mobile device, computing device, smart watch, smart phone, and the like. The one or more actions performed by the user, on the web or mobile applications, via the user device are referred to as one or more events. The examples of the one or more events may include but not limited to page views, click events, form submissions, login and logout events, product interactions, adding product to cart, purchasing products, search queries, and the like. In an embodiment, the application on which the user may perform the one or more events may be tenant applications. In the realm of software, a tenant application is a software service or application designed for and utilized by a specific user or organization within a single or multi-tenant system. Each tenant operates in an isolated space, ensuring privacy and security by keeping their data and configurations separate from other tenants in the shared environment. The tenant applications may also be referred as tenants.

Referring now to FIG. 1, a block diagram of a system illustrating a network 100 implementation for providing one or more customized experience to a user profile. The network 100 includes a system 102, one or more user devices 104-N (for example but not limited to one or more user devices 104-1, 104-2 . . . 104-N) associated with one or more user profiles, first data storage device 116, and second data storage device 114. Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. In one implementation, the system 102 may comprise the cloud-based computing environment in which the system is configured to execute remotely located applications. Further, system 102, first and second storage devices 114, 116, and user device 104 may communicate through a network 106. Examples of the user devices 104 may include, but are not limited to, a portable computer, a personal digital assistant, a handheld device, and a workstation.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In an example, the system 102 may include at least one processor 108, an input/output (I/O) interface 110, a memory 112, and one or more modules explained later in the description. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions. For example, the memory may include receiving module, transmitting module, categorization module, evaluating module, and the like to perform one or more steps of the method disclosed in the description.

In an embodiment, the system 102 may store received data in the first and second storage devices 114, 116, at different stages of classifying the user profile into one or more segments. The received data may include one or more events associated with the application, information associated with the one or more events, segment definitions, and the like. In an embodiment, the first storage device 114 may be a distributed repository. In the distributed repository, data may be stored across multiple nodes or servers. The data may be replicated or partitioned across different nodes, and each node may store a portion of the data. This helps in replicating the data and ensuring a fault tolerant system. In an embodiment the first and second storage devices 114, 116 may reside on the system 102. In yet another embodiment, the first and second storage devices 114, 116 may reside outside the system 102 and may be communicatively coupled to the system 102.

In operation, the system 102 may be configured to providing one or more customized experience to a user profile. To provide the customized experience, the system may query a key-value pair store to retrieve a key-value pair associated with the user profile and load them in a first memory. Further, the system may receive a plurality of segment definitions associated with the one or more segments. The plurality of segment definitions is stored in a second memory. The system may then map the one or more events corresponding to the retrieved key-value pair, with the one or more segment definitions and classify the user into the one or more segments. Further, the system may provide one or more customized experience to the classified user profile.

Figure 2:
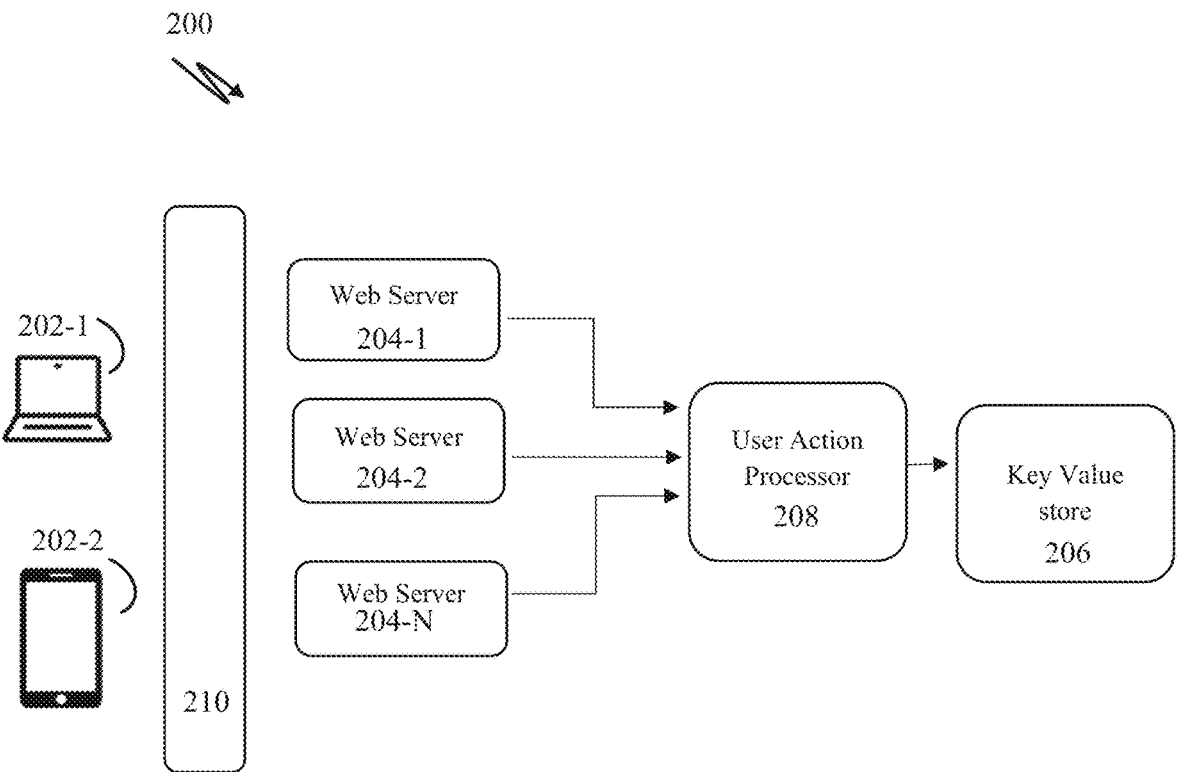
FIG. 2 is a block diagram of an example system, depicting generating a key value pair associated with a user, in accordance with various embodiments of the present subject matter.

The detailed functioning of the system 102 is described below with the help of FIG. 2. Referring now to FIG. 2, a diagram 200 comprising interaction of the one or more components of the network 100. In an embodiment, the system 102 may be configured to receive the one or more events and the information associated with the one or more events via an API. The one or more events along with the information may be transmitted to the system 102 via a web application or mobile application installed on a user device 202-1, 202-2, collectively referred as 202. The system may be hosting a web server (204-1, 204-2 . . . 204-N) to receive the one or more events in the form of HTTP requests. The web server may function as an entry point for recording information associated with the one or more events. The information may include the application details and its type, user action, event type, user ID, timestamp, event specific data, action performed by the user, and any other relevant details associated with the one or more events. This may be understood with the help of an example, when a user interacts with an ecommerce website by adding a product to their shopping cart. The web server may receive the user event or action (i.e., addition of the product to the cart) and the associated information through the API. The information may include web application, user's action, product added, the user's identifier, timestamp, and any other relevant metadata. In an embodiment, the web server may be implemented on the system. In yet another embodiment, the web server may reside outside the system 102 and may exist as a separate entity.

In an embodiment, the system 102 may use a load balancer 210 to distribute incoming network traffic from the user devices 202 across multiple web servers 204 to ensure optimal resource utilization, maximize throughput, and minimum response time. When an event is received, the load balancer may perform one or more steps like, evaluating current load on the web servers 204 and selecting a web server from the web servers 204 based on the current load to process the received event. The load balancer may continuously monitor the health and performance of the web servers. If a web server becomes unavailable or experiences increased load, the load balancer may reroute traffic to other available web servers.

In an embodiment, upon reception of the one or more events performed by the user on the application, the system may generate a key-value pair associated with the user profile. The key in the key-value pair may indicate an identifier (ID) of the user and the value may comprise one or more events performed by the user on the application. The identifier may be a unique identifier identifying the user. In an embodiment, the system may randomly generate the user identifier by using one or more algorithms, via a user action processor 208. For example, the user identifier may be generated by combining username, email address, time stamps of user events, or other user-specific details. The user action processor 208 upon receiving the one or more events from the web server may generate a key, i.e., a user identifier for a set of events performed by the user. In an embodiment, the user action processor 208 may process the received user events. The processing may include parsing, extracting, validating, transforming, the information associated with the received user events.

In an embodiment, the system may associate the key i.e., the user identifier generated for a particular user with the one or more events performed by the user corresponding to the particular user profile and store the key-value pair in the key value store 206. The key value store 206 may correspond to the distributed repository 114 of FIG. 1. The distributed repository may store key value pairs corresponding to one or more users. In one embodiment, the user events received from the one or more users may be partitioned based on criteria like user ID ranges or hash values of user IDs. For example, each partition may contain the user events for a subset of user IDs. For instance, one partition for user IDs 1-500, another for 501-1000, and so on. In yet another embodiment, the system may use hash functions to store the user events in the key value store 206. Each node in the distributed repository may be responsible for storing a portion of the events received from various users. To determine which node should store data associated with a particular user ID, the hash function may be applied to the user ID. For example, when an event needs to be stored in the system, the hash function is applied to the user's ID to determine which node in the network should store the event. The event is then sent to that node for storage. Since the hash function produces a consistent hash value for the same input, any subsequent requests for the same user's events will also be directed to the same node. Thus, this distribution enables parallel access and improving scalability. In an embodiment, the key-value pair may be stored in a compressed or optimized format to reduce memory footprint and increase retrieval speed.

In an embodiment, the system may determine whether a number of events stored in the key-value pair associated with the user is greater than a predetermined threshold value. To this end, the system may continuously monitor the key-value store to determine if the number of events in the key value pair are greater than the predetermined threshold value. The monitoring process may involve periodically checking of the key-value store. In an embodiment, with each update of user event to the key-value pair, the system may compare the user event count against the predefined threshold value. If the count exceeds the threshold value, the system may generate alert to indicate that the key-value pair has reached a significant level of activity or has met certain conditions. The alert may be a sound alert like an alarm or visual alerts like displaying messages. In an embodiment, the threshold value may be determined based on one or more parameters like, storage capacity of the key value store, processing capability of the system, and number of user events received. In an embodiment, the system may dynamically adjust the threshold value based on historical data or changing conditions to adapt to evolving user behaviour patterns or system requirements.

In an embodiment, upon determination that the user events in the key value pair have exceeded the threshold value, the system may be configured to remove at least one event from the key-value pair. For example, the at least one event may be identified based on timestamps to ensure that at least one event that caused the threshold exceedance are targeted for removal. The system may at least remove the event based on first-in-first-out of the one or more events. The system may be configured to iterate through the user events which may be beyond the threshold value limit and remove them from the storage.

Figure 3A:
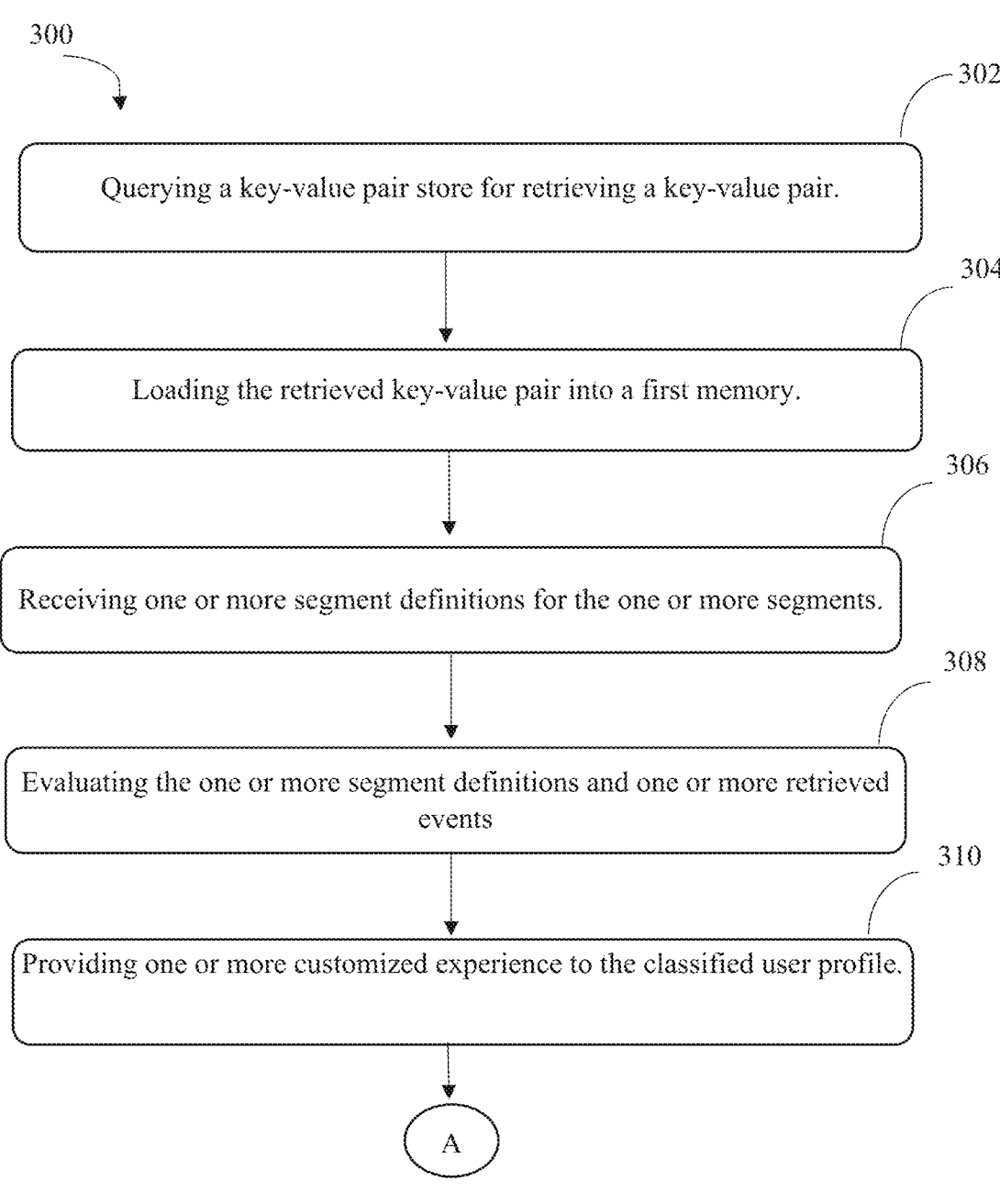
FIGS. 3*a* and 3*b* is a flow diagram illustrating an example method for providing one or more customized experience to a user profile, in accordance with various embodiments of the present subject matter.
Figure 3B:
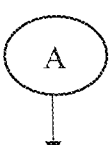

Referring to FIGS. 3a and 3b now, in an embodiment, the system 102, at step 302, may be configured to query the key-value store for retrieving a key-value pair associated with a user. The key value store 206 has been discussed in FIG. 2. The system may retrieve the key-value pair associated with the user profile upon receiving a request to classify the user profile into the one or more segments. A segment of the one or more segments is associated with a set of rules to provide the customized experience to the user profile on the application. The customized experience may be targeted advertisements, offers, deals, and the like for a particular user. In an embodiment, the set of rules may be determined based on one or more events performed by users. For example, a set of rules may be like, users who have signed up in the last 7 days and added products worth $100 or more to their shopping cart and have not checked out for more than 24 hrs. Yet another example of a set of rules may include users who have shopped for over $1000 in the last one year and added products worth $100 or more to their shopping cart and have not checked out for more than 24 hrs. The set of rules may be defined based on the user actions taken by the user on the application.

In an embodiment, the system may retrieve the key-value pair associated with the user profile from the key value store based on the identifier of the user. For example, the system may use the generated user ID for the user, which may serve as the primary identifier for retrieving the key-value pair. To retrieve the key-value pair from the key value store memory, the system may first apply the hash function to the user's ID to determine which node stores the corresponding value i.e., the user events corresponding to the user. Upon determination of a target node, the system may send a query to the target node or partition in the distributed key value store 206. The query may include instructions to perform a lookup operation in the target node or the partition, based on the hashed user ID. The system may then retrieve the key-value pair associated with the user ID from the targeted node or the partition. Once the key-value pair is retrieved, the system may extract the one or events stored in the key-value pair, corresponding to the user. The key-value pair store may store key-value pairs for multiple user profiles.

In an embodiment, the system, at step 304, may be configured to load the retrieved key-value pair into a first memory. The key-value pair corresponding to the user is retrieved from the key-value store and is saved in another memory referred as first memory. For example, the value in the key-vale pair may correspond to for example 50,000 events performed by the user. The 50,000 events may be retrieved from the key-value store and is loaded in the first memory. The key-value store and first memory are different memories. In an embodiment, the first memory may reside on the system 102. In yet another embodiment, the first memory may reside outside the system 102.

Figure 4:
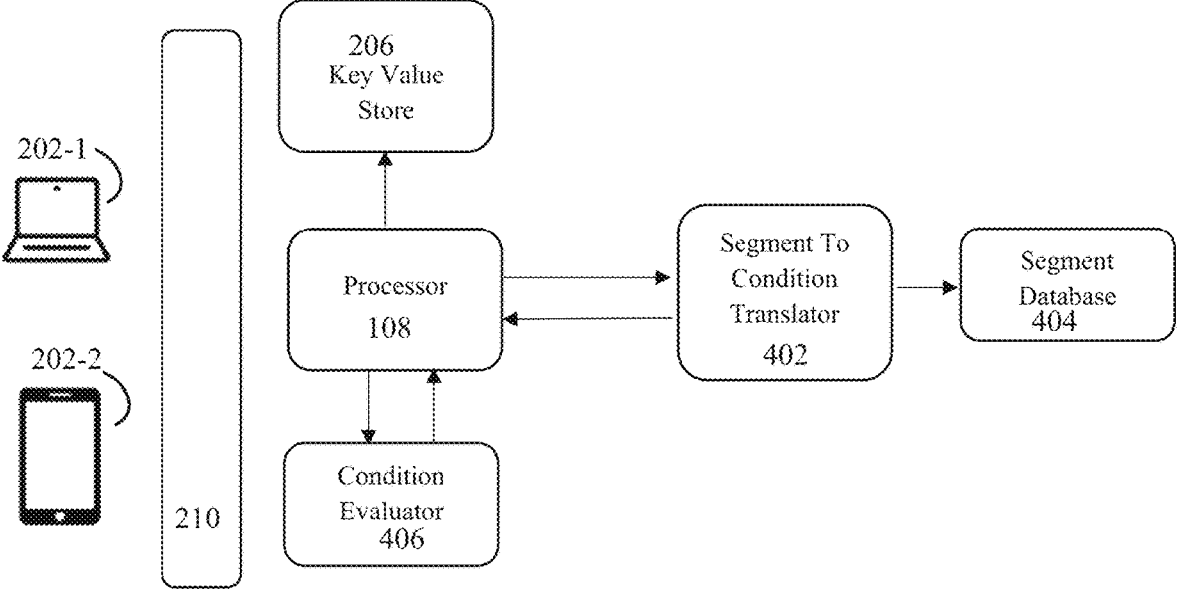
FIG. 4 is a block diagram of an example system for providing one or more customized experience to a user profile, in accordance with various embodiments of the present subject matter.

In an embodiment, the system, at step 306, may be configured to receive one or more segment definitions associated with the one or more segments from a second memory. In an embodiment, the one or more segment definitions are received from the second memory. The one or more segment definitions may be received from the second memory to the first memory. The one or more segment definitions comprise rules for mapping the one or more user events to one or more segments. In an embodiment, the one or more segment definitions and the retrieved key-value pair are processed simultaneously in the first memory to classify the user into the one or more segments. Referring to FIG. 4 now, the second memory may be the segment database 404. The segment database stores the one or more segment definitions. The one or more segment definitions may be defined based on at least one of user profile, user behaviour, user transaction on the application, user interaction with the application, user subscription, combination of user events, an attribute of an event, and/or an absence of the event performed on the application. The user profile may include information regarding location of the user, device of the user for example, if the user is using an iPhone or any other mobile device so that purchasing power of the user may be determined. This purchasing power may help in categorise the user accordingly for customized experience. The user behaviour may include information like if the user is a frequent buyer, season shopper, or one time purchaser, and the like. The user interactions may include information like active user, occasional user, or inactive user, based on time spent by the user on the application. The user transaction may include details regarding the user's spent on the application in months, years, or since the user has logged in. The user interaction may include information like, if the user purchase items, if the user scrolls regarding information related to different items, and the like. The attributes of the event may include additional details or context of the user event. The attribute may be the metadata associated with the user event. For example, if the user event is adding a product to the shopping cart, the attribute may be the quantity of items added to the cart. In yet another example, if the user event is to scroll the application, the attribute may be the time spent in scrolling the application. The system may capture all the data for defining the one or more segment definitions. In an example like a user added a product of price greater than $100 to the cart but hasn't checked out. The system may capture such definitions and store them as JSON file in the segment database 404.

In an embodiment, the system at step 308 may be configured to evaluate the one or more segment definitions and one or more retrieved events in the first memory. In an embodiment, the one or more segment definitions and one or more retrieved events are loaded in the first memory simultaneously, for execution. The simultaneously loading of the one or more segment definitions and the one or more retrieve events leads to providing the customized experience to the user within sub second latency. For example, the system may retrieve a key value pair, from the retrieved key-value pair the system may know the User Id and corresponding user. Based on the user the system may now simultaneously load the one or more segment definitions into the first memory. In order to evaluate, the system may convert the one or more segment definitions into a plurality of filter conditions. The conversion may be performed via the segment to condition translator 402 of the system. For instance, the conversion process is explained below in the context of following events performed by different users on the application.

User1 signed up 5 days back on the application, adds 10 product worth $100 each to the cart, and has purchased 5 units of a product 1 month ago.

User2 signed up 100 days back and User2 has purchased products of $1200 in last one year, adds 10 product worth $100 each to the cart 2 month ago.

The system may capture these user events and may store these events in the key store value 206. Further, based on these events, segment definitions may be defined and may be stored in segment database 404. The segment definitions may be defined by at least the system 102 and a user. In an embodiment, the system may use machine learning algorithm to define the one or more segment definitions. The machine learning model may continuously learn from one or more prior segment definitions corresponding to particular user events. Based on the learned data the system may predict segment definitions for similar events. The system via the segment to condition translator 402 may convert these stored segment definitions into filter conditions for comparing with the user events. In this example, based on the stored segment definitions (as discussed above) for different users, one of the filter conditions may be created, for example filter conditions 1, users who have signed up in the last 7 days and added products worth $100 or more to their shopping cart and have not checked out for more than 24 hrs. Based on the above example, the another filter conditions may be created, for example filter conditions 2, users who have shopped for over $1000 in the last one year and added products worth $100 or more to their shopping cart and have not checked out for more than 24 hrs.

Figure 5:
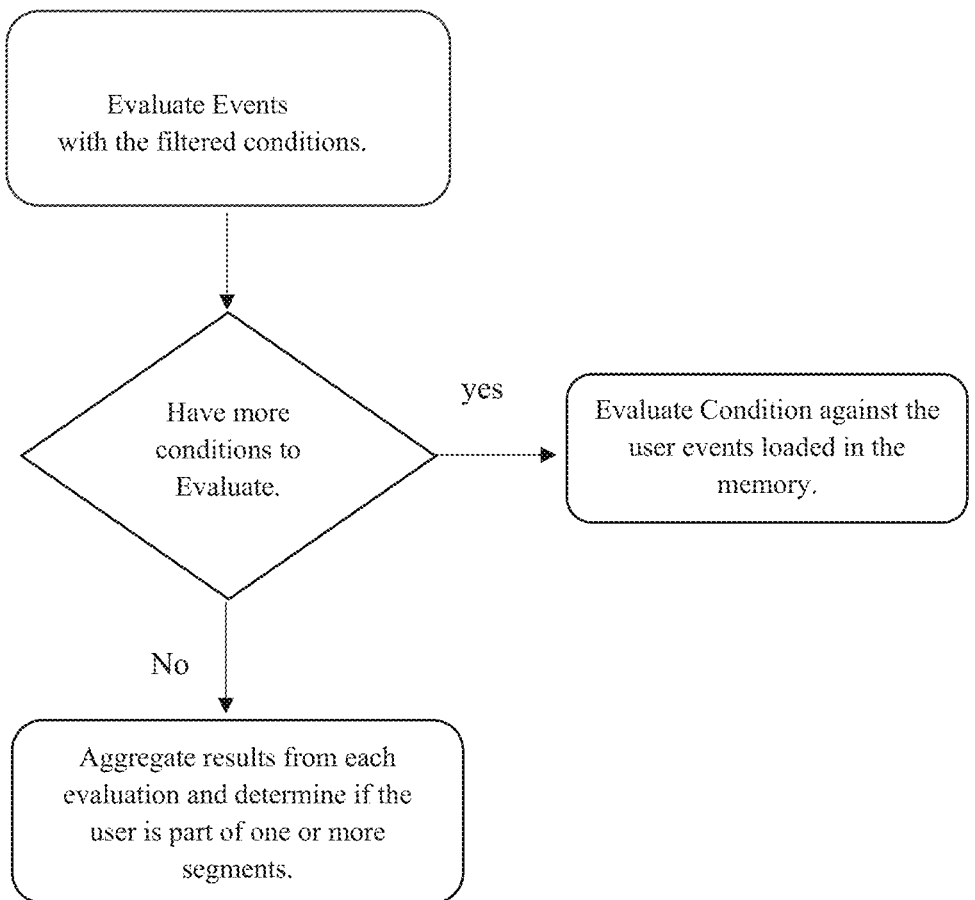
FIG. 5 is a block diagram of an example system for evaluating one or more user events against filtered condition for the classification, in accordance with various embodiments of the present subject matter.

In an embodiment, the system may map the one or more retrieved events associated with the user profile with the plurality of filter conditions. In order to map, the system may compare the one or more events with the plurality of filter conditions via a condition evaluator 406. For example, the system may load the retrieved key-value pairs corresponding to one or more users, in the first memory and a plurality of filtered conditions for comparison among these. For example, the first memory may be memory 112 of the system 102. The processor 108 may then perform the mapping, via the condition evaluator 406. Refer to FIG. 5, the condition evaluator 406 may evaluate, the one or more events in a sequential manner with the filtered conditions corresponding to different segments. For example, the one or more user events are mapped with the filter conditions 1 discussed above in a sequential manner. Further, the one or more user events are mapped with the filter conditions 2. The condition evaluator may check if one or more filtered conditions are left for evaluation. If the condition evaluator 406 determines that a condition is left for evaluation, the system may then evaluate the condition against the one or more user events loaded in the first memory. If the condition evaluator 406 determines that no condition is left for evaluation, the system then aggregates the results obtained from the evaluation. In an embodiment, the system may use SQL queries to retrieve the plurality of filter conditions and map them against the one or more user events. In an embodiment, the system may optimize the SQL queries by creating indexes on may be one or more attributes used in the plurality of filter conditions. For example, the creation of the indexes may be based on size of data like number of user events. In an embodiment, if the number of the user events may be greater than a predetermined threshold, the respective indexes maybe created to process the user events. The one or more attributes may include profile, demographics, user behaviour, user subscription, user transaction, and the like. For example, if a query needs to identify users who have made purchases within a specific time frame or who have purchased certain types of products, an index on the user transaction history attribute may significantly speed up the retrieval process. For example, a user may have made multiple purchases over the past year, consisting of various products ranging from electronics to clothing. Their transaction history would reflect these purchases, showing the details of each transaction. In an embodiment, one or more index maybe created on the one or more user events. The user events may be characterized by attributes such as event type, timestamp, user ID, etc. Indexes on these attributes facilitate fast retrieval and matching against segments criteria. For example, if a query seeks to locate all user events of a particular category (e.g., 'purchase') within a specified time period, utilizing an index that combines the 'event type' and 'timestamp' attributes may accelerate the search operation and result in a more rapid mapping against segment definitions. Thus, indexing helps in achieving the task to be performed within sub-second latency.

In an embodiment, the system at step, may then classify the user into one or more segment upon determining that the one or more events performed by the user matched with the plurality of filter conditions associated with the one or more segments, based on the comparison. For example, considering following filter conditions to compare based on retrieved user events:

1. Filter conditions 1 corresponding to segment 1: Users who have signed up in the last 7 days and added products worth $100 or more to their shopping cart and have not checked out for more than 24 hrs.

2. Filter conditions 2 corresponding to segment 2: Users who have shopped for over $1000 in the last one year and added products worth $100 or more to their shopping cart and have not checked out for more than 24 hrs.

For instance, if the system receives user events from three different users i.e., User1, User2, User3. The users have been associated with corresponding user profiles. The users may have performed the following actions/ events via the mobile or web applications:

a. User1 signed up 2 days back.

b. User1 adds 3 product worth $50 each to her cart.

c. User2 signed up 400 days back.

d. User3 signed up 500 days back.

e. User2 has purchased 10 units of a product 1 month ago.

f. User3 has purchase 2 products worth $25 4 months ago.

The system may store the above received events in the key value store 206 against each of the user-IDs as discussed above. When upon receiving the request to categorize the users into the one or more segments, the system may compare the one or more filter conditions in segment 1 and segment 2 with the one or more user actions performed by the user. In order to compare, the system may retrieve the key value pairs stored in the key value store and store them in the first memory. The system may then start executing the filtered conditions in the segment 1 one by one. Based on the example above user1 has satisfied the first condition of segment 1 as she has signed up 2 days back. Then the system checks for the subsequent condition of cart having more than $100 worth of merchandise and determines that user 1 qualifies for it. Based on the above comparison, the system may categorise the user 1 under segment 1. Upon categorization of user 1 under segment 1 the system may provide customized experience to the user on the application.

In an embodiment, the system then compares the filtered conditions in segment 2 with the user actions performed by the user 1, to determine if the user 1 can be categorized under segment 2. The system sequentially compares the filtered conditions provided in segment 2 with the one or more actions performed by the user 1. Upon comparing, the system determines that user 1 is not a part of segment 2 as she has signed up only 2 days back. In this case the system may not evaluate the subsequent conditions of segment 2. As a result, the system may not categorize the user 1 under segment 2. The system may perform the same steps for User 2 and User 3 and does not categorize the User 3 under segment 1 or 2.

In an embodiment, the system may be configured to associate the respective segment with the user in which the user profile has been classified. The system may now provide, at step 310, one or more customized experience to the respective user profile based on the classification. For example, if the system may classify the user profile into one or more segments like 'Frequent Shoppers,' 'Occasional Buyers,' and 'New Users.' For the Frequent shoppers the system may provide customized recommendations for these users in accordance with their purchase history. They may be presented with recommendations for supplementary products, early access to new arrivals, or exclusive discounts on frequently purchased items. For the Occasional Buyers the system may provide personalized promotions and discounts on products that have piqued their interest but remain unsold. To encourage a purchase, for instance, an occasional customer who frequently peruses a specific product category without completing a transaction could be offered a limited-time discount on those items. For New Users the system may provide a first-time buyer discount, free shipping on their initial order, or a personalized welcome message with recommendations based on their indicated preferences during onboarding.

In an embodiment, the system, at step 312, may be configured to update the one or more customized experience upon detecting a change in the one or more user events associated with the user profile. As a user associated with the user profile interacts with the application, their actions/user events are continuously monitored and analysed in real-time. When a user logs in or browses the website, the system classifies the user profile in another segment and update the customized experience based on that segment. For example, the system dynamically adjusts the user experience to provide relevant recommendations, promotions, and content tailored to their segment. Thus, the present technical implementation leverages efficient data structures (key-value pairs, segment definitions), memory management techniques (separate stores for user events, segment definitions, and rules), and real-time evaluation and mapping processes to provide highly personalized and dynamic customized experiences to users within the application.

Exemplary embodiments discussed above may provide certain advantages. Though not required to practice aspects of the disclosure, these advantages may include those provided by the following features.

Certain embodiments of the disclosure introduced provides reduced sub-second latency. This involves segregating the storage of segment definitions and one or more user events into distinct memory units. Following the loading of the one or more user events into the system's memory, the execution of filtered conditions on these events can be accomplished within 100 milliseconds, thereby enabling the system to achieve a p99.9 sub-second latency.

Certain embodiments of the disclosure lead to cost-effective storage solutions by storing user events separately in key value stores than the system's memory. This approach contributes to overall cost efficiency, resulting in reduced costs per million requests served.

Certain embodiments of the disclosure facilitate the evaluation of segment definitions outside the key value store, within an application layer. This strategy optimizes the utilization of CPU resources within the application layer, thereby enhancing efficiency in segment evaluation.

Although implementations for methods and system for categorising the users in to one or more segments have been described in language specific to structural features and/or methods, it is to be understood that the appended claims are not necessarily limited to the specific features or methods described. Rather, the specific features and methods are disclosed as examples of implementations for processing information associated with one or more user events.

We claim:

1. A method for providing one or more customized experience to a user profile associated with an application with sub-second latency, the method comprising:

retrieving a key-value pair, from a key value store, associated with the user profile, wherein a key in the key-value pair indicates an ID of a user and a value in the key-value pair indicates one or more user events associated with the user profile;

loading the retrieved key-value pair into a first memory;

receiving one or more segment definitions corresponding to one or more segments, wherein the one or more segment definitions comprise rules for mapping the one or more user events to one or more segments;

evaluating the one or more segment definitions and one or more retrieved events in the first memory, wherein the evaluation comprises:

converting the one or more segment definitions into a plurality of filter conditions;

mapping the one or more retrieved events associated with the user profile with the plurality of filter conditions; and classifying the user profile into the one or more segments based on the mapping; and providing, within the sub-second latency, one or more customized experience to the classified user profile, wherein:

determining whether a number of user events in the key-value pair is greater than a threshold value, wherein upon the determination of the number of user events is greater than the threshold value:

generating an alert; and removing at least one event from the key-value pair in response to the number of events in the key-value pair is greater than the threshold value, wherein the at least one event is removed based on first-in-first-out of the one or more user events.

2. The method of claim 1, wherein the one or more segment definitions are based on at least one of the user profile, user behaviour, user transaction on the application, user interaction with an application, and user subscription, and wherein the one or more segment definitions are stored in a second memory.

3. The method of claim 1, wherein the one or more retrieved events associated with the user profile are mapped with the plurality of filter conditions in a sequential manner.

4. The method of claim 1 further comprises:

training a machine learning model using historical segment definitions associated with one or more user events; and predicting, by the machine learning model, segment definitions for the one or more user events based on patterns extracted from the historical segment definitions.

5. The method of claim 1, wherein the evaluation further comprising:

determining if one or more conditions of the plurality of filter conditions is remaining for evaluation;

upon determination, evaluate the one or more remaining conditions against the one or more user events stored.

6. The method of claim 1, wherein an operation of loading the retrieved key-value pair and receiving the one or more segment definitions, in the first memory is performed simultaneously.

7. The method of claim 1 further comprises:

receiving a request to classify the user profile into at least a segment of the one or more segments, wherein at least the segment is associated with a set of rules to provide the customized experience to the user profile on the application, wherein classifying the user into the one or more segments comprises:

classify the user profile into at least a segment of the one or more segments upon determining that the one or more events match with the plurality of filter conditions associated with at least the segment.

8. A system for providing one or more customized experience to a user profile associated with an application with sub-second latency, the system comprising:

a memory storing one or more instructions; and a processor communicatively coupled with the memory, wherein the one or more instructions upon execution causes the processor to:

retrieve a key-value pair, from a key value store, associated with the user profile, wherein a key in the key-value pair indicates an ID of a user and a value in the key-value pair indicates one or more user events associated with the user profile;

load the retrieved key-value pair into a first memory;

receive one or more segment definitions corresponding to one or more segments, wherein the one or more segment definitions comprise rules for mapping the one or more user events to one or more segments;

evaluate the one or more segment definitions and one or more retrieved events in the first memory, wherein the evaluation comprises:

convert the one or more segment definitions into a plurality of filter conditions;

map the one or more retrieved events associated with the user profile with the plurality of filter conditions; and classify the user profile into the one or more segments based on the mapping; and provide, within the sub-second latency, one or more customized experience to the classified user profile, wherein:

determine whether a number of user events in the key-value pair is greater than a threshold value, wherein upon the determination of the number of user events is greater than the threshold value:

generate an alert; and remove at least one event from the key-value pair in response to the number of events in the key-value pair is greater than the threshold value, wherein the at least one event is removed based on first-in-first-out of the one or more user events.

9. The system of claim 8, wherein the one or more segment definitions are based on at least one of the user profile, user behaviour, user transaction on the application, user interaction with an application, and user subscription, and wherein the one or more segment definitions are stored in a second memory.

10. The system of claim 8, wherein the one or more retrieved events associated with the user profile are mapped with the plurality of filter conditions in a sequential manner.

11. The system of claim 8, wherein the processor is further configured to:

train a machine learning model using historical segment definitions associated with one or more user events; and predict, by the machine learning model, segment definitions for the one or more user events based on patterns extracted from the historical segment definitions.

12. The system of claim 8, wherein to evaluate the processor is further configured to:

determine if one or more conditions of the plurality of filter conditions is remaining for evaluation;

upon determination, evaluate the one or more remaining conditions against the one or more user events stored.

13. The system of claim 8, wherein the processor is further configured to:

receive the one or more events associated with the user profile;

generate the key-value pair corresponding to the user profile; and store the key-value pair in the first memory, wherein the first memory is a distributed repository.

14. The system of claim 8, wherein the processor is further configured to:

receive a request to classify the user profile into at least a segment of the one or more segments, wherein at least the segment is associated with a set of rules to provide the customized experience to the user profile on the application.

\* \* \* \* \*